(12) United States Patent
Fitzpatrick et al.

(10) Patent No.: US 10,592,296 B2
(45) Date of Patent: *Mar. 17, 2020

(54) MAINTAINING STATE INFORMATION IN A MULTI-COMPONENT, EVENT-DRIVEN STATE MACHINE

(71) Applicant: International Business Machines Corporation, Armonk, NY (US)

(72) Inventors: Michael Gerard Fitzpatrick, Raleigh, NC (US); Andrew Hilliard Arrowood, Raleigh, NC (US); Gary Owen McAfee, Raleigh, NC (US); Sue L. Huang, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/451,972

(22) Filed: Mar. 7, 2017

(65) Prior Publication Data

US 2017/0177419 A1  Jun. 22, 2017

Related U.S. Application Data

(63) Continuation of application No. 14/831,141, filed on Aug. 20, 2015, now Pat. No. 9,588,780, which is a continuation of application No. 14/565,286, filed on Dec. 9, 2014, now Pat. No. 9,588,779.

(51) Int. Cl.
*G06F 9/50* (2006.01)
*G06F 9/448* (2018.01)
*G06F 9/54* (2006.01)

(52) U.S. Cl.
CPC .......... *G06F 9/5083* (2013.01); *G06F 9/4498* (2018.02); *G06F 9/542* (2013.01)

(58) Field of Classification Search
CPC ......... G06F 9/546; G06F 9/444; G06F 9/5083
See application file for complete search history.

(56) References Cited

U.S. PATENT DOCUMENTS

| | | | |
|---|---|---|---|
| 2003/0135533 A1 | 7/2003 | Cook | |
| 2004/0078633 A1* | 4/2004 | Holland | G06F 11/1464 714/5.11 |
| 2010/0023805 A1* | 1/2010 | Colaiacomo | G06F 11/1438 714/15 |

(Continued)

OTHER PUBLICATIONS

IBM Multi-site Workload Lifeline V2.0 User's Guide, Version 2, Release 0, Chapter 1, Jun. 2014.

*Primary Examiner* — Charles E Anya
(74) *Attorney, Agent, or Firm* — Jeffrey S. LaBaw; David H. Judson

(57) ABSTRACT

A method, apparatus and computer program product that allows for maintaining correct states of all sub-components in a state machine, even as sub-components leave the state machine and later rejoin in some previous state. Preferably, this is achieved without requiring the system to remember the states of all sub-components or a log of every event that was fed into the state machine. Thus, the technique does not require any knowledge of the previous state of the sub-components nor the need to preserve a complete log of events that were fed into the state machine. The state machine may be used to enhance the operation of a technological process, such as a workload management environment.

18 Claims, 4 Drawing Sheets

(56) References Cited

U.S. PATENT DOCUMENTS

2012/0166390 A1* 6/2012 Merriman ......... G06F 17/30578
                                                                            707/613
2012/0297067 A1 11/2012 Arrowood et al.
2012/0297068 A1 11/2012 Arrowood et al.

* cited by examiner

MAINTAINING STATE INFORMATION IN A MULTI-COMPONENT, EVENT-DRIVEN STATE MACHINE

BACKGROUND OF THE INVENTION

Technical Field

This disclosure relates generally to data processing systems and, in particular, to state machines.

Background of the Related Art

State machines, also referred to as "finite state machines," are computing devices designed with the operational states required to solve a specific problem. In a typical state machine, events are fed into the system to transition the state machine from one state to another. In more complex state machines, the state machine is made up of different sub-components; the sub-components (or some of them) could be on the same system as a main component, or the sub-components can be spread across different systems that can be located a geographical distance apart from each other. These different sub-components often feed events into the main component of the state machine, as well as transition into states of their own, e.g., based on events fed from other sub-components of the state machine.

A significant challenge in managing a state machine is trying to maintain a time-consistent state of each of the sub-components of the overall state machine, especially when events are being fed into the main component and sub-components (or even the main component) have temporarily removed themselves from the state machine. Once the sub-components have rejoined the state machine, for the state machine to continue to operate appropriately, these sub-components need to be transitioned into the same time-consistent state as the other sub-components, based on the last state of these sub-components prior to them leaving the state machine.

It is known in the prior art to preserve state information in a state machine, but such techniques rely on recording the states of all sub-components, as well as all state-transitioning events. This is a costly and complex requirement, and one that increases the difficulty in managing the state machine.

BRIEF SUMMARY

Generally, this disclosure describes a method that allows for maintaining correct states of all sub-components in a state machine, even as sub-components leave the state machine and later rejoin in some previous state. Preferably, this is achieved without requiring the system to remember the states of all sub-components or a log of every event that was fed into the state machine. Thus, the method does not require any knowledge of the previous state of the sub-components nor the need to preserve a complete log of events that were fed into the state machine.

Generally, the method works as follows. The state machine comprises a main component, and one or more sub-components. For each sub-component, the state machine main component is configured to record a log of events. The log includes a state transition for each sub-component. Triggering events result in the state machine transitioning into a different, well-known state. When the state machine is currently active and processing events, and if a sub-component then joins the state machine, either for the first time, or after temporarily leaving the state machine, the sub-component is transitioned to a time-consistent state with the rest of the sub-components using minimal information. In particular, when the sub-component joins/rejoins the state machine, and using information in the log for that sub-component, the state of the sub-component is forced back to its initial state, preferably using just a single transition event, prior to initiating a replay.

The transition information is "minimized" according to a pruning scheme. To this end, only the events that cause a state transition for this sub-component need to be recorded by the main component and replayed. A triggered event that reverses a state transitioning as a result of a prior event, or if the new event is a superset of a prior event, can allow the prior event to be "pruned" from the log of events for this sub-component. As the state machine is fed a continuous set of triggering events, this "pruning" of the log for the sub-component makes management of the state machine easier, as fewer events need to be saved for each sub-component.

According to another aspect, a redundant main component is provided. The redundant main component has the capability to be used to take over (assume) management of the entire state machine should the main component fail or otherwise be unreachable.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
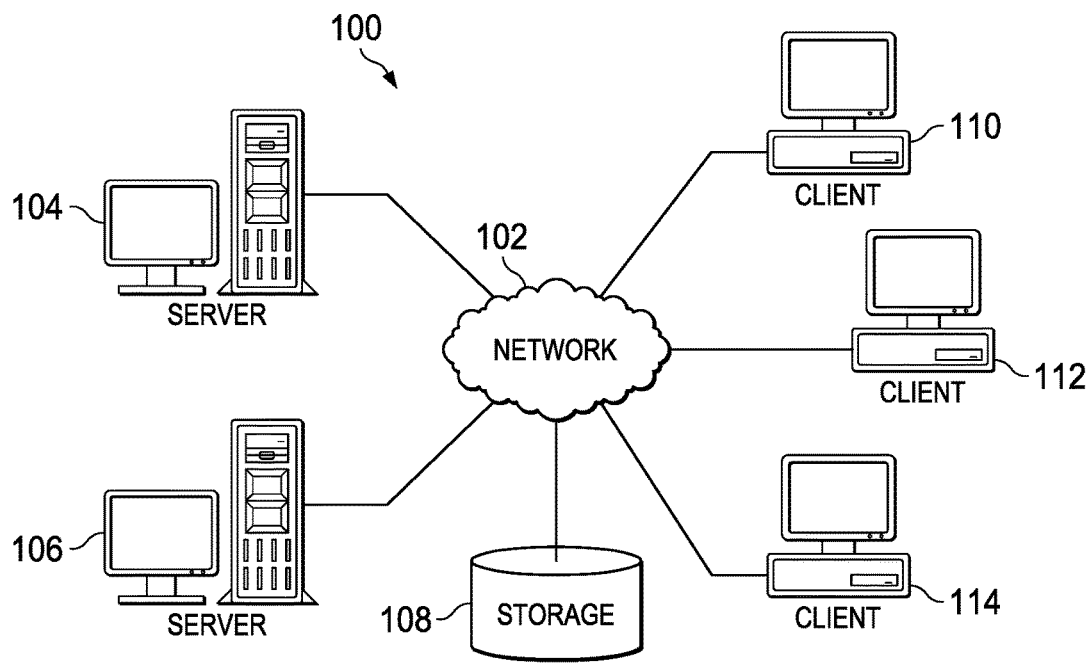
FIG. 1 depicts an exemplary block diagram of a distributed data processing environment in which exemplary aspects of the illustrative embodiments may be implemented.
Figure 2:
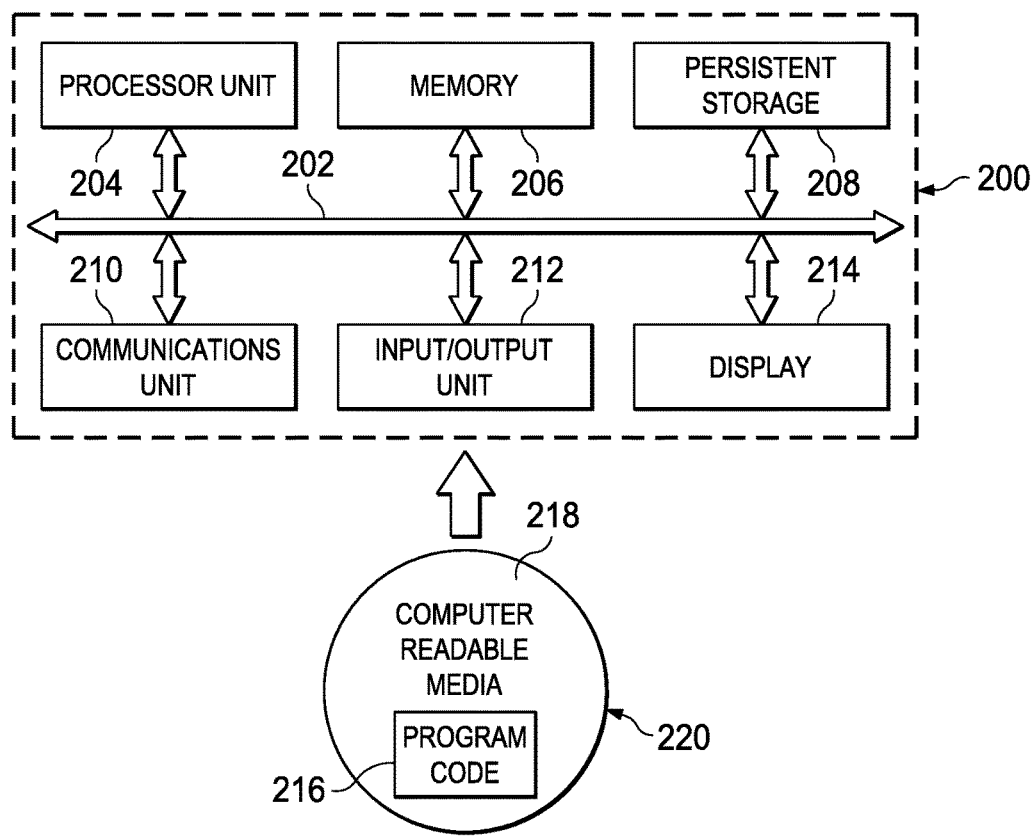
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

State Machines

As described above, state machines, also referred to as "finite state machines," are computing devices designed with the operational states required to solve a specific problem. In a typical state machine, events are fed into the system to transition the state machine from one state to another. In more complex state machines, the state machine is made up of a main component, and one or more different sub-components. The main component is responsible for capturing all events submitted to the state machine. The main component pushes each "event" out to all connected sub-components, where an "event" is any input into the state machine that may affect an existing state of a sub-component. The main component logs any event that causes the sub-component to transition state. In particular, and with respect to an event that the main component pushes out to all connected sub-components, the main component "records" the event for any sub-component that later connects to the state machine, and, in particular, so that the main component can "replay" the event to get that sub-component back to a correct current state. A sub-component may (and typically does) have its own state transitioning scheme, such that a single event received by the sub-component from the main component may affect one sub-component differently than for another sub-component.

The sub-components (or some of them) could be on the same system as the main component, or they can be spread across different systems that can be located a geographical distance apart from each other. As noted above, these different sub-components often feed events into the main component of the state machine, as well as transition into states of their own, e.g., based on events fed from other sub-components of the state machine.

Figure 3:
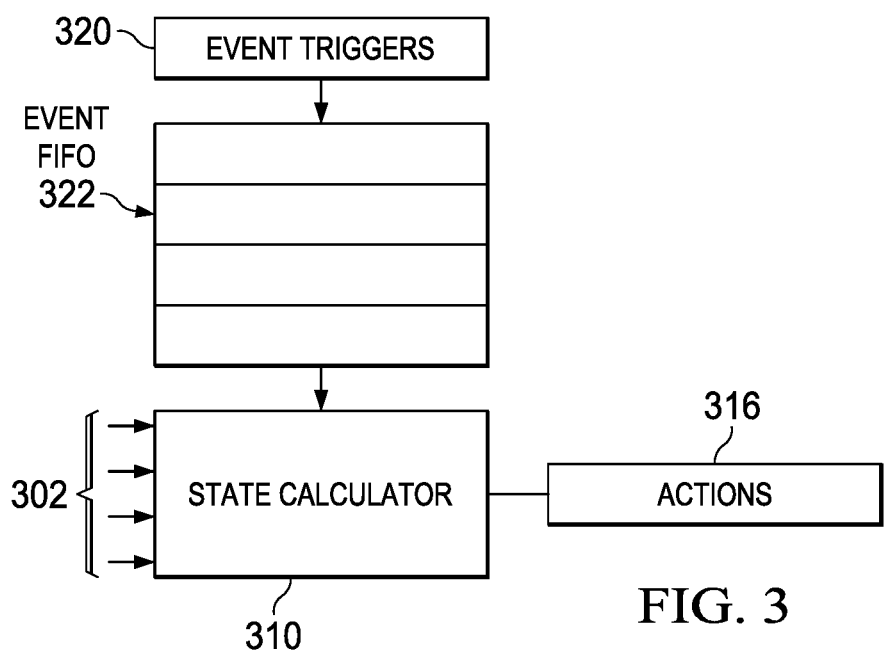
FIG. 3 illustrates a software state machine.

Software may operate as a state machine. With reference now to FIG. 3, a block diagram of a typical software state machine is shown. The software inputs are shown as conditions 302. A state calculator 310 determines whether to make a state change based on the current state and the conditions. The state calculator may comprise a sequence of conditional statements, such as "if-then" statements, or it may use other means such as a switch statement or a dispatching table. Control is provided by the invocation of actions 316, which may be software instructions, programs, methods, etc. Synchronization is achieved by monitoring events that have been collected, e.g., into an event FIFO (first-in, first-out). Thus, a software state machine may include event triggers 320 that "listen to" events and record them into FIFO 322. Typically, the event triggers simply monitor for a change in conditions 302. The design of a software state machine such as described may be straightforward for some applications. The designer creates a table of states, actions and conditions. A programmer then creates software instructions for each potential state transition. This is no easy task, particularly for more complicated state machines. Also, once a software state machine is created, it may be difficult to make changes. For example, if there is an error in one of the state transitions, it would be very difficult to locate and modify the instructions that pertain to that particular state transition in the code.

Typically, the techniques of this disclosure are implemented in software-based state machines, although this is not a limitation. The techniques may also be practiced in hardware-based state machines, or in a state machine that is both hardware- and software-based.

Maintaining State Information in a Multi-Component, Event-Driven State Machine

With the above as background, the technique of this disclosure is now described.

A state machine in which the technique may be practiced comprises a main component, and one or more sub-components. The main component is responsible for capturing all events submitted to the state machine, and for pushing out these events to all connected sub-components. The main component also has the capabilities, as have been described, of both recording events, and for replaying recorded events. Further, each sub-component is assumed to have its own state transitioning scheme, such that a single event received by that sub-component from the main component may affect that sub-component in some unique way (that differs from an effect that event has on some other sub-component). An event is any input into the state machine that affects or might affect the existing state of a sub-component.

According to this disclosure, the main component establishes and maintains a "log" for each sub-component. Generically, the log is a data structure that is stored in memory or otherwise accessible from disk storage. The sub-component logs may be separate and part of an integrated log maintained by the main component. A log includes event information for the sub-component and, in particular, the set of events that have been received and processed by the main component for that sub-component. According to a feature of this disclosure, a sub-component log is subject to a "pruning" operation (implemented by the main component) where it is appropriate to do so. A sub-component log that has been "pruned" by the main component is sometimes referred to as a "pruned log." Thus, a pruned log may be deemed to a part (or a subset) of a sub-component log. The pruned log typically includes just a subset of the event information for that sub-component but that subset has the property of being a minimal set of event information necessary to enable that sub-component to be joined or re-joined to the state machine. Stated another way, the subset of event information in the pruned log is necessary and (in of and itself) sufficient to facilitate the replay operation when necessary. That pruned log, however, does not include extraneous or additional event information that is not necessary to facilitate the replay.

In one embodiment, the main component tracks (in the log for a particular sub-component) each of the events that is associated with that sub-component. Periodically and continuously (or, otherwise, on-demand), the main component provides the further operation of pruning those events to remove from the log certain of those events that (because of the structure of the state machine and, in particular, the interrelationships among its components) are extraneous or unnecessary to facilitate any subsequent replay operation that might be executed by the main component with respect to one or more sub-components. A main component may prune events from each of the sub-component logs at the same time, or one log at a time, or upon some other defined scheduled (e.g., to optimize the computational efficiency and/or to better manage data storage or memory requirements). By pruning the logs in this manner, the main component is ensured of having a more manageable (i.e., the minimum-necessary) list of events that will need to be replayed to ensure proper joinder or re-joinder (of a sub-component) to the state machine.

Another aspect of this disclosure is that the main component is operative to force sub-components to a well-known initial state prior to replaying the list of events recorded while a particular sub-component is not connected to the state machine. To this end, the state machine is designed in such a manner that a transition from any state in the state machine directly to the initial state can be achieved using just a single event. The capability to (to transition a sub-component from any state to an initial state) is available to the main component regardless of what state the sub-component was in at the time the sub-component connected to the state machine. With this characteristic in place, any sub-component that was previously connected (or, for that matter, never connected) to the state machine, still can be forced (by the main component) to the initial state, and this forcing operation occurs prior to the replay. In other words, and according to this aspect, the state machine does not need to have any knowledge (a priori or otherwise) of what the current state of the sub-component is at the time the sub-component connects to the state machine, because the main component is provided with the ability to set the sub-component back to the initial state (with just a single event).

By implementing log pruning, as well as by enabling the forcing of sub-components to a well-known initial state prior to replaying, an improved state machine operation is realized.

One additional aspect of this disclosure is the providing of a redundant main component that has the capability to be used to take over (assume) management of the entire state machine should the main component fail or otherwise be unreachable.

These above-described functions and characteristics are now illustrated in the context of a concrete example. This example scenario is not intended to limit this subject matter.

Figure 4:
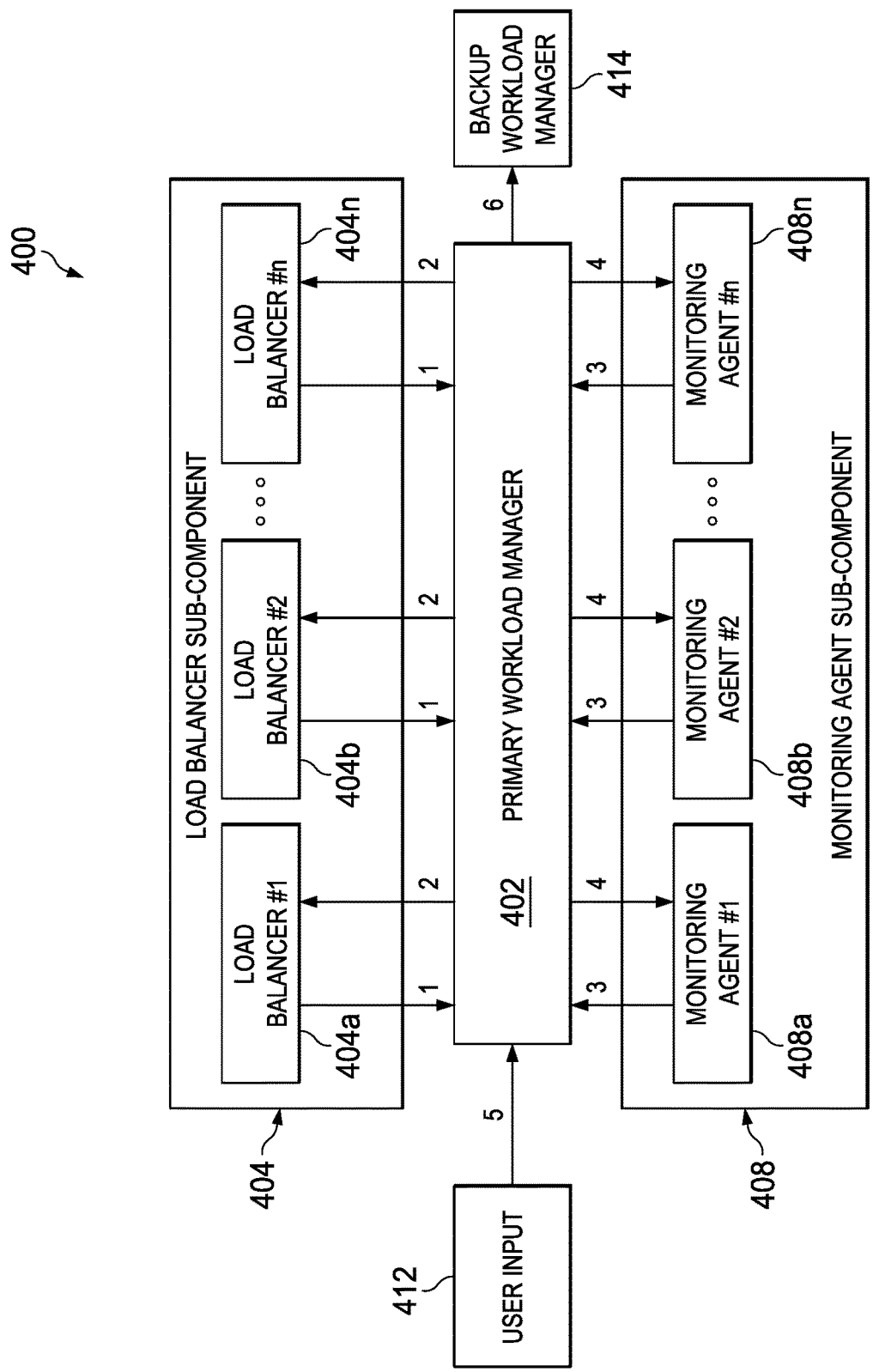
FIG. 4 illustrates how a state machine that implements the management technique of this disclosure may be implemented in a workload management environment.

In particular, FIG. 4 illustrates one example of a multi-component, event-driven state machine 400 in which the subject matter of this disclosure may be implemented. The state machine has at least one main component, and a set of one or more sub-components. Here, the main component 402 of the state machine is a primary workload manager. It contains (or has associated therewith) a load balancer sub-component having one or more load balancers 404*a-n*. The main component 402 also contains (or has associated therewith) a monitoring agent sub-component having one or more monitoring agents 408*a-n*. The state machine also includes a user input sub-component 412. As shown, the state machine may include a redundant main component 414, which, in this example, is a backup workload manager. The backup workload manager 414 is enabled to take over (assume) management responsibility for the main component in the event the main component fails or is otherwise no longer in communication.

Preferably, the state information that is maintained by the state machine 400 includes three elements: (1) a current state of workloads configured to the state machine; (2) a current set of applications that are defined to a workload configured to the state machine; and (3) a state of the applications that are defined to a workload configured to the state machine.

In this example scenario, a load balancer sub-component 406*a* provides an event to the workload manager component, as shown by flow "1." This event contains, e.g., a list of server applications that are of interest to the load balancer sub-component 404. From a workload manager component perspective, this event is assumed not to change the state of the workloads or the state of the applications defined for the workloads, but it may change the current set of applications defined for the workloads. As also depicted, the other load balancers likewise may provide similar events to the main component.

In like manner, a monitor agent sub-component 410a provides an event to the workload manager component, as shown by flow "3." This event contains, e.g., a state of the applications that are defined to the workloads. From a workload manager component perspective, this event is assumed not to change the set of applications defined for the workloads, but it may change either the state of the workloads or the state of the applications defined for the workloads. As depicted, the other monitoring agent sub-components likewise may provide similar events to the main component.

As also shown, the user input sub-component 412 provides an event to the workload manager component, as shown by flow "5." This event contains, e.g., a desired state of the workloads. From a workload manager perspective, this event is assumed not to change the set of applications defined for the workloads or the state of the applications defined for the workload, but it may change the state of the workloads.

When a change to the workload state is recognized by the workload manager component 402, it sends this information to the load balancer sub-component, as shown by flow "2." This workload state change transitions the load balancer sub-component to a new state, and it also transitions the workload manager 402 to a new state.

In like manner, when a change to the set of applications is recognized by the workload manager component 402, it sends this information to the monitoring agent sub-component, as shown by flow "4." This application set change transitions the monitoring agent sub-component to a new state, and it also transitions the workload manager to a new state.

The above notwithstanding, in this particular operating environment, when a change to the application state is recognized by the workload manager component 402, neither the load balancer sub-component 404 nor the monitoring agent sub-component 408 needs to transition to a new state. In this example environment, this application state change, however, does transition the workload manager 402 to a new state.

Further, when a load balancer sub-component 404 joins or leaves the state machine 400, such an event transitions the workload manager component 402, and it possibly transitions the monitoring agent sub-component 408 into different states. Likewise, when a monitoring agent sub-component 408 joins or leaves the state machine 400, the event transitions the workload manager component 402, and it possibly transitions the load balancer sub-component 404 into different states.

Whenever an event causes the workload manager component 402 or one of the sub-components (404, 408) to transition into a new state, the workload manager component 402 logs the event for possible playback. The workload manager component also sends the event to the backup workload manager component, as shown by flow "6." This enables the backup workload manager component to maintain its own history of events, should the primary workload manager component fail.

As the components and sub-components of state machine 400 continue to receive events and transition to different states, and depending on the various states and the inter-relationships among the main component and its sub-components, it is possible that an event received by the main component will then "supersede" or "reverse" a previous event. According to this disclosure, and to eliminate the need to maintain a log of every event entering the state machine, the main component performs a log pruning operation. In particular, and as explained above, this "pruning" of prior events keeps the history log of events for a particular sub-component to a more manageable size. Whenever a "pruning" of the log is done by the workload manager component 402, it also sends this "pruned" log of events to the backup workload manager component as well, as shown by flow "6."

The pruning operation is now described by way of several examples.

Assume the state machine consists of three defined workloads, and two events from the user input sub-component 412 are received to activate the first workload followed by the second workload; then, assume a third event from the user input sub-component is received to "activate" all three workloads under the one event. In such case, and according to this disclosure, the first two events can be "pruned" from the log, because the third event supersedes the prior two events.

As another example, with the same three defined workloads, assume that two events from the user input sub-component 412 are received to activate the first workload following by the second workload; then, assume a third event from the user input sub-component is received to "inactivate" the first workload. In such case, once again the first event can be "pruned" from the log, because the third event reverses the first event.

The above example scenarios are merely exemplary and are not intended to limit the subject matter of this disclosure. That said, they help illustrate why maintaining (and as appropriate "pruning") the log of events for a sub-component is highly desirable.

As also noted, preferably the workload manager establishes and maintains a log of events for each sub-component. As described, the workload manager periodically and continuously prunes each of those logs to ensure that the number of events therein remains manageable, and further that a particular log includes a minimum amount of event information necessary to facilitate a subsequent replay operation.

Continuing with the above-example scenario, the maintenance of the per sub-component log by the workload manager ensures that any load balancer or monitoring agent sub-components that join the state machine after state transitioning events have been processed still are transitioned to the correct state. In particular, consider the scenarios above, where a log contains two events, one for activating the second workload and one for inactivating the first workload. When a load balancer sub-component either joins or rejoins the state machine, the first thing the workload manager component does it then force the load balancer sub-component into a well-known initial state. This is followed by the workload manager component sending the two logged events, in order, to the load balancer sub-component that has joined/re-joined. This results in the load balancer sub-component having states of "inactive" for the first workload, "active" for the second workload, and an "initial" state for the third workload—the same state information shared by all currently-joined load balancer sub-components.

The techniques of this disclosure may be implemented during the ordinary operation of a state machine as sub-components join or are re-joined, or when a particular component (even the main component) fails. The technique typically is implemented when the state machine is configured, and as the state machine operates.

The following provides an additional example of how state information is maintained and used by the main component according to this disclosure. In this example scenario, the load-balancer sub-component is assumed to react to events that affect workloads. If the state machine contains say, five, workloads named workload A-E, each of these workloads can have different states. As noted above, preferably the workload manager always creates/records an event to force all workloads to their initial state, e.g., in this case, an event that marks all workload states to '0.' Now, assume Event1 marks the state of all these workloads as state '1.' This new event is recorded by the workload manager in the applicable log(s). The initial event recorded by the workload manager, however, is never removed. Later, when Event2 marks the state of, say, workloads A-C, as state '2,' this results in Event1 being expanded to five (5) unique events (namely, an Event1 for each of the workloads A-E). Event2 also is recorded by the workload manager, which (because of the pruning operation) removes Event1 from the list for the first three workloads A-C. When the load-balancer sub-component then joins the state machine, the initial event first is replayed (setting all workload states to the initial state of '0'). This is followed by Event1 being replayed, but only for the last two workloads D and E, and then by Event2 being replayed, but only for the first three workloads A, B and C.

As noted above, the main component records events to facilitate the replay functionality and, in particular, to transition a sub-component to the correct current event. For example, suppose a state machine can transition from an initial state A to either state B or C. From state B, assume the state machine can further transition to state D or E, or from state C it might transition to state F or B. When the main component receives an event for a sub-component to transition from state A to state C, for example, and then from state C to B, then the only event that needs to be recorded for this sub-component is an event to transition from A to B.

The sub-component log of events is also important to maintain in the backup workload manager component in the event of a failure of the primary workload manager component. Again, consider the example scenarios, where a log contains two events, one for activating the second workload, and one for inactivating the first workload. All load balancer sub-components that are currently joined to the state machine have states of inactive for the first workload, active for the second workload, and initial state for the third workload. If the primary workload manager component 402 fails for any reason, the backup workload manager component 414 becomes the main component of the state machine 400. When this occurs, all load balancer and monitoring agent sub-components temporarily leave the state machine and rejoin with the new main component. As each load balancer sub-component rejoins the state machine, the workload manager component forces the load balancer sub-component into a well-known initial state, and then replays the two logged events. This ensures that all load balancer sub-components are in the same state as they were prior to the original workload manager component failure.

A further motivation behind the subject technique may be explained as follows. It is known of course that a state machine can transition from one state to another based on events, but it is not possible to simply skip over states to get to another state. For example, if the only way to get to state 10 is through state 5 or state 6, the machine cannot use a single event to transition from, say, state 4 to state 10; rather, one must transition to state 5 or 6 first before going to state 10. In the example scenario, sub-components can join/rejoin in an unknown state, and thus the workload manager cannot assume that it can transition immediately to state 10, because the workload manager cannot be certain that the sub-component is in state 5 or 6. Accordingly, by building the state machine such that any single event can transition the sub-component to its initial state (call it state 1), then the workload manager knows how to transition from state 1 to state 10, in particular, by using the set of events it has logged to get the sub-component to that state.

Figure 5:
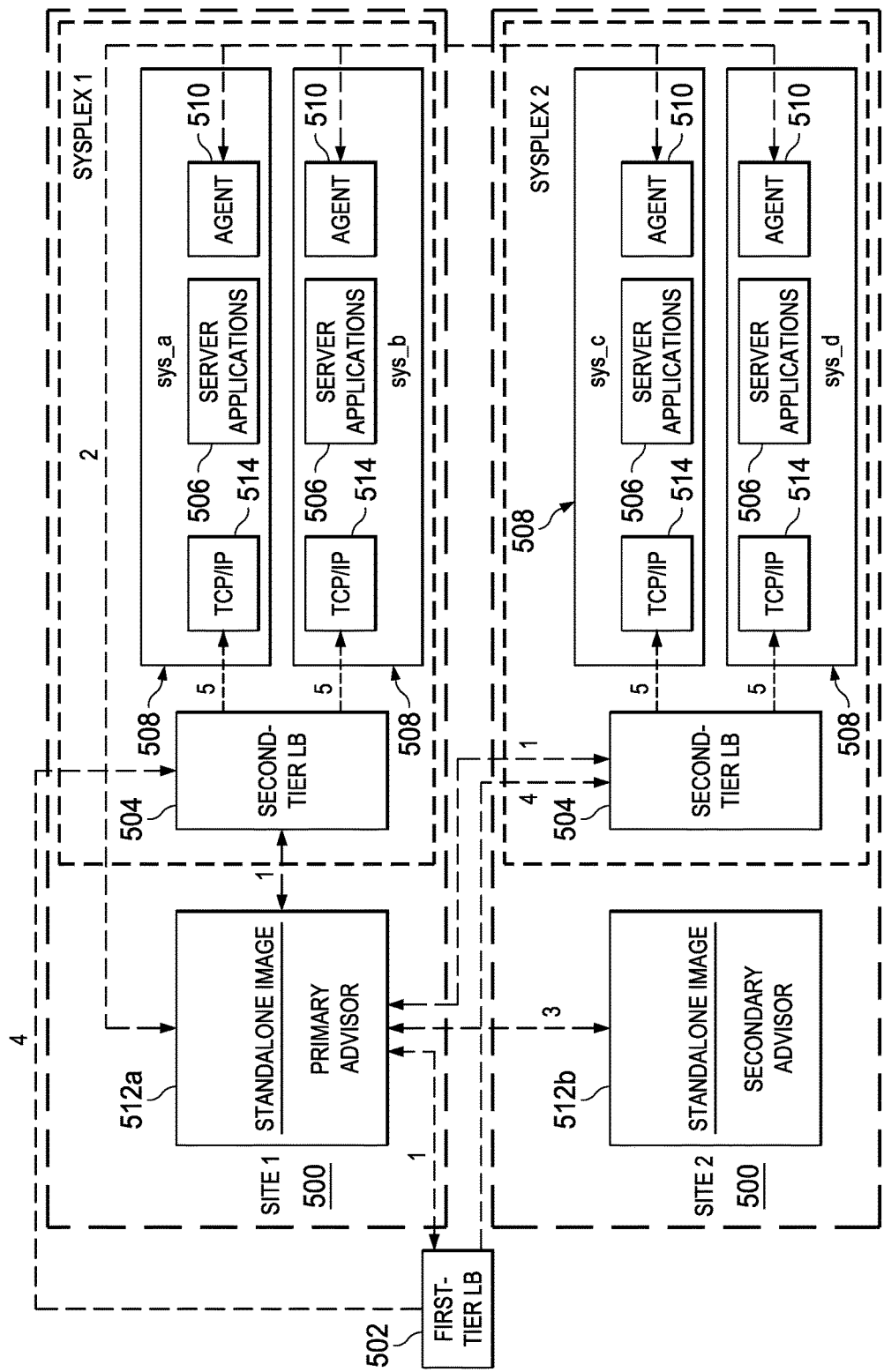
FIG. 5 provides an example use case for the state machine shown in FIG. 4.

FIG. 5 illustrates a representative implementation of a workload management environment that implements a state machine such as described above in FIG. 4. In this example, IBM® Multi-site Workload Lifeline is used to implement the management environment to load balance TCP/IP workload requests across two sites at unlimited distances, when both sites are running the same server applications and have the same data sources. Although two sites are shown, there may be additional sites. In this example, and as will be seen, the system preferably defines two (2) tiers of load balancing. Generally, a first-tier load balancer registers application groups that contain members that are in both sites. These members are considered second-tier load balancers. An external load balancer, operating as a second-tier load balancer, registers groups of server applications that are on the same site. As this external load balancer receives a workload connection request from a first-tier load balancer, the external load balancer distributes the request to one of the server applications in the matching application group.

Each workload that is configured to Multi-site Workload Lifeline is classified as an active/standby or active/query workload. By definition, an active/standby workload can be distributed to only one site at a time, because the workload might contain transactions that update databases. By contrast, an active/query workload can be distributed to both sites at the same time, because the workload contains only transactions that query databases. Multi-site Workload Lifeline enforces the single or dual site distribution. If more than one workload is configured, some of the workloads can be distributed to one site, some workloads can be distributed to the other site, and the remaining workloads can be distributed to both sites.

As seen in FIG. 5, and in a concrete (but non-limiting) example, each site 500 is configured as a systems complex or "sysplex." A sysplex is a collection of Multiple Virtual Storage (MVS) systems that cooperate, using certain hardware and software products, to process work. The sysplex increases the number of processing units and MVS operating systems that can cooperate, which in turn increases the amount of work that can be processed at the site. It uses a standard communication mechanism (the cross-system coupling facility, or XCF) for MVS system applications that enables communication between application programs on one or multiple computers. From an architecture standpoint, typically the sysplex is made up of a number of central processor complexes (CPCs) that collaborate, through specialized hardware and software, to process a work load. A single CPC comprises a single central processor (CP) and all associated system hardware and software, controlled by a single copy of the operating system (e.g., z/OS). One typical operating scenario for a sysplex is where applications running simultaneously on separate systems must be able to access the same data, or update a single database, etc., without compromising data integrity.

In this implementation, which is merely representative, a first-tier load balancer 502 determines which site 500 to route a new workload request to, and forwards the request to a second-tier load balancer 504 within that site 500. The second-tier load balancer 504 within the site determines which server application 506 within the site to route the workload request to, and forwards it to the z/OS system 508 where the server application is running. IBM Multi-site Workload Lifeline includes functionality to provide the different tiers with routing recommendations based on the availability and health of the server applications and the z/OS systems within the site.

In this particular implementation environment, Workload Lifeline includes agents 510 and advisors 512. The advisors are implemented by z/OS WorkLoad Manager (WLM)). As illustrated, typically agents 510 execute on each z/OS system 508 in the two sites, and operate to monitor the health of the server applications 506 and the system where the agent is active. The agents 510 periodically send this information to the primary advisor 512a, as indicated by the network flows labeled 2. The primary advisor 512a uses this information to calculate routing recommendations for the workloads that use these server applications. The advisor 512a periodically sends recommendations to first-tier load balancers 502 about which site to route workload requests to, and recommendations to second-tier load balancers 504 about which server applications within a site 500 to route the workload requests to, as indicated by the network flows labeled 1. The primary advisor 512a also periodically notifies the secondary advisor 512b about any changes in the workload states, indicated by the network flows labeled 3, so that the secondary advisor 512b can take over primary advisor responsibilities if the current primary advisor 512a becomes non-operational.

Thus, when workload requests are handled by the first-tier load balancers 502, based on routing recommendations from the advisor 512, the load balancer 402 selects a site 500 and forwards the request to the second-tier load balancer 404 in that site, indicated by the network flow labeled 4. When workload requests are handled by the second-tier load balancers 504, based on routing recommendations from the advisor 512, the load balancer 504 selects a server application 506 in the site and forwards it to the TCP/IP stack 514 running on the z/OS system 508, indicated by the network flow labeled 5. When these second-tier load balancers 504 are external, they receive routing recommendations directly from the advisor 512. When these second-tier load balancers 504 are internal, also known as z/OS sysplex distributors, they reside on a z/OS system 508 in the site, and receive routing recommendations directly by using z/OS Communications Server functions.

In this operating scenario, a workload comprises one or more groups of applications that access the same data sources to provide related services for a client. In this example, preferably all server applications in a load balancer application group provide the same service for that client, and preferably each server application within an application group can provide the same services as the other applications in the group. The system provides the ability to group server applications that access different data sources into their own workload to provide more granular control of each group of applications.

In this example embodiment, a site is synonymous with a sysplex. Preferably, all z/OS target systems in a particular site belong to the same sysplex. In a typical configuration, and as described, the first-tier load balancer determines which site to route a new workload request to and forwards the request to a second-tier load balancer. The second-tier load balancer determines which server application within the site to route the workload request to and forwards it to the z/OS system where the server application is running. Multi-site Workload Lifeline provides the different tiers with routing recommendations based on the availability and health of the server applications and the z/OS systems within the site.

In the above-described example scenario, the main component of the state machine is the primary advisor (the workload manager). It contains a load balancer sub-component, a monitoring agent sub-component, and a user input sub-component (not shown). In addition, preferably there is a redundant main component, as has been described.

The technique of this disclosure provides significant advantages. Foremost, the approach avoids the requirements of continuously recording and maintaining the states of all sub-components, as well as recording and maintaining information regarding state-transitioning events. The approach provides for a computationally-efficient as well as a data storage-efficient approach to managing a state machine and, in particular, to enable the state machine main component to reflect and maintain a time-consistent state of each of its sub-components, especially when events are being fed into the main component and sub-components (or even the main component) have temporarily removed themselves from the state machine. The approach enables the state machine to continue to operate appropriately and correctly even as sub-components join or re-joined the state machine. To that end, the main component readily and efficiently transitions those sub-components as necessary into a same time-consistent state as the other sub-components in the state machine.

As a skilled person will appreciate, the techniques herein provide for a method that allows for maintaining correct states of all sub-components in a state machine, even as sub-components leave the state machine and later rejoin in some previous state. This is achieved without requiring the system to remember the states of all sub-components or a log of every event that was fed into the state machine. Thus, the method does not require any knowledge (a priori or otherwise) of the previous state of the sub-components nor the need to preserve a complete log of events that were fed into the state machine. As a result, when a state machine of this type is used in association with another technological process (such as the workload manager in FIG. 5), the other technological process is improved significantly.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. The techniques herein may be practiced in a loosely-coupled server (including a "cloud"-based) environment. An example of the latter environment is an Information Technology (IT) infrastructure that supports virtualization of resources. An environment of this type typically comprises host machines (HVs) (e.g., servers or like physical machine computing devices) connected to a physical datacenter network, typically via a hypervisor management VLAN. The environment typically also includes load balancers, network data switches (e.g., top-of-rack switches), firewalls, and the like. Physical servers in the environment are each adapted to dynamically provide one or more virtual machines (VMs) using virtualization technology. Multiple VMs can be placed into a single host machine and share the host machine's CPU, memory and other resources, thereby increasing the utilization of an organization's data center.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, a software-based state machine that implements the above-describe functionality is implemented in or across a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

Having described our invention, what we now claim is as follows.

The invention claimed is:

1. A method for managing a state machine comprising a main component, and one or more sub-components, wherein the main component maintains, for each sub-component, a log of events associated with transitions in states of the main component and the one or more sub-components, comprising:
   for each sub-component, and in response to occurrence of an event that causes the sub-component to transition state, determining whether the event supersedes or reverses a prior event previously logged in association with a state transition of the sub-component;
   upon determining that the event supersedes or reverses the prior event previously logged in association with a state transition, pruning the prior event from the log to generate a pruned log;
   upon joinder or re-joinder to the state machine of a given sub-component, and prior to the main component initiating a replay operation for the given sub-component, the replay operation replaying one or more events recorded by the main component while the given sub-component is not connected to the state machine, forcing the given sub-component into an initial state; and
   thereafter, and during the replay operation, using the pruned log to transition the given sub-component from its initial state to a time-consistent state associated with the main component.

2. The method as described in claim 1 wherein the given sub-component is placed into the initial state using one and only one event.

3. The method as described in claim 1 further including recording the triggering event in the log.

4. The method as described in claim 1 further including saving the log and the pruned log in association with a backup main component.

5. The method as described in claim 4 further including transitioning the backup main component to function as the main component upon a failure of the main component.

6. The method as described in claim 1 wherein the state machine manages operational states for a workload management environment.

7. Apparatus for managing a state machine comprising a main component, and one or more sub-components, wherein the main component maintains, for each sub-component, a log of events associated with transitions in states of the main component and the one or more sub-components, comprising:
   one or more hardware processors;
   computer memory holding computer program instructions executed by the hardware processors and operative to:
      for each sub-component, and in response to occurrence of an event that causes the sub-component to transition state, determine whether the event supersedes or reverses a prior event previously logged in association with a state transition of the sub-component;
      upon determining that the event supersedes or reverses the prior event previously logged in association with a state transition, prune the prior event from the log to generate a pruned log;
      upon joinder or re-joinder to the state machine of a given sub-component, and prior to the main component initiating a replay operation for the given sub-component, the replay operation replaying one or more events recorded by the main component while the given sub-component is not connected to the state machine, force the given sub-component into an initial state; and
      thereafter, and during the replay operation, use the pruned log to transition the given sub-component from its initial state to a time-consistent state associated with the main component.

8. The apparatus as described in claim 7 wherein the given sub-component is placed into the initial state using one and only one event.

9. The apparatus as described in claim 7 wherein the computer program instructions are further operative to record the triggering event in the log.

10. The apparatus as described in claim 7 wherein the computer program instructions are further operative to save the log and the pruned log in association with a backup main component.

11. The apparatus described in claim 10 wherein the computer program instructions are further operative to transition the backup main component to function as the main component upon a failure of the main component.

12. The apparatus as described in claim 7 wherein the state machine manages operational states for a workload management environment.

13. A computer program product in a non-transitory computer readable medium for use in a data processing system for managing a state machine comprising a main component, and one or more sub-components, wherein the main component maintains, for each sub-component, a log of events associated with transitions in states of the main component and the one or more sub-components, the computer program product holding computer program instructions executed by the data processing system and operative to:
   for each sub-component, and in response to occurrence of an event that causes the sub-component to transition state, determine whether the event supersedes or reverses a prior event previously logged in association with a state transition of the sub-component;
   upon determining that the event supersedes or reverses the prior event previously logged in association with a state transition, prune the prior event from the log to generate a pruned log;
   upon joinder or re-joinder to the state machine of a given sub-component, and prior to the main component initiating a replay operation for the given sub-component, the replay operation replaying one or more events recorded by the main component while the given sub-component is not connected to the state machine, force the given sub-component into an initial state; and
   thereafter, and during the replay operation, use the pruned log to transition the given sub-component from its initial state to a time-consistent state associated with the main component.

14. The computer program product as described in claim 13 wherein the given sub-component is placed into the initial state using one and only one event.

15. The computer program product as described in claim 13 wherein the computer program instructions are further operative to record the triggering event in the log.

16. The computer program product as described in claim 13 wherein the computer program instructions are further operative to save the log and the pruned log in association with a backup main component.

17. The computer program product described in claim 16 wherein the computer program instructions are further operative to transition the backup main component to function as the main component upon a failure of the main component.

18. The computer program product as described in claim 13 wherein the state machine manages operational states for a workload management environment.

* * * * *